United States Patent [19]

Klippert et al.

[11] 4,330,653
[45] May 18, 1982

[54] PROCESS FOR THE POLYMERIZATION OF VINYL CHLORIDE IN AN AQUEOUS PHASE

[75] Inventors: Heinz Klippert, Burgkirchen; Dieter Ulmschneider, Königstein, both of Fed. Rep. of Germany

[73] Assignee: Hoechst Aktiengesellschaft, Frankfurt, Fed. Rep. of Germany

[21] Appl. No.: 228,137

[22] Filed: Jan. 26, 1981

[30] Foreign Application Priority Data

Feb. 2, 1980 [DE] Fed. Rep. of Germany ....... 3003778

[51] Int. Cl.³ .......................... C08F 2/20; C08F 14/06
[52] U.S. Cl. .................................. 526/200; 526/201; 526/202; 526/344.2
[58] Field of Search ...................... 526/200, 201, 202

[56] References Cited

U.S. PATENT DOCUMENTS 3,696,085 10/1972 Lederer ............................. 526/307.1
3,758,425 9/1973 Jastrow ................................ 526/201

*Primary Examiner*—C. A. Henderson
*Attorney, Agent, or Firm*—Connolly and Hutz

[57] ABSTRACT

A process for the polymerization of vinyl chloride in an aqueous phase in the presence of oil-soluble free-radical initiators and a mixture of at least two high-molecular, surface-active suspending agents is described. This mixture is composed of 10 to 90% by weight (relative to the mixture) of at least one copolymer formed from vinyl acetate and a compound of the formula

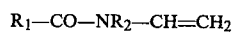

$$R_1\text{—CO—}NR_2\text{—CH=CH}_2$$

wherein $R_1$ is H or alkyl having 1 to 4 C atoms and $R_2$ is H or methyl, and of 90 to 10% by weight (relative to the mixture) of at least one cellulose ether or a partially acetylated polyvinyl alcohol. Homopolymers, copolymers or graft copolymers of vinyl chloride which have an improved combination of properties are obtained.

8 Claims, No Drawings

PROCESS FOR THE POLYMERIZATION OF VINYL CHLORIDE IN AN AQUEOUS PHASE

The subject of the invention is a process for the polymerization of vinyl chloride in an aqueous phase in accordance with patent claim 1.

Austrian patent specification No. 232,729 discloses a process for the polymerization of vinyl chloride in an aqueous dispersion in the presence of poly-N-vinylpyrrolidone and monomer-soluble polymerization catalysts, wherein, in addition to 0.001 to 0.5% by weight, relative to vinyl chloride, of poly-N-vinylpyrrolidone or derivatives thereof, 0.001 to 0.5% by weight, relative to vinyl chloride, of water-soluble cellulose ethers, polyvinyl alcohols or polyvinyl phosphates is used. Copolymers formed from N-vinylpyrrolidone and other polymerizable organic compounds, particularly methyl and ethyl esters of acrylic and methacrylic acid, vinyl acetate and vinyl propionate and also dimethyl maleate or diethyl maleate and after-heated, water-soluble copolymers formed from N-vinylpyrrolidone and unsaturated carboxylic acid amides are mentioned as examples of derivatives of poly-N-vinylpyrrolidone, but there is no illustrative embodiment of these. The aim of the process is to produce polymers which do not suffer any discoloration, or only suffer discoloration after a prolonged period, under hot conditions, even if lead stabilizers are added to them. Nothing is stated concerning an improvement in the porosity of the polymer particles, which as a rule ensures improved plasticiser-absorption and ease of degassing.

German Auslegeschrift No. 1,645,380 also discloses a process for the polymerization of vinyl chloride in an aqueous suspension in the presence of monomer-soluble catalysts and copolymers formed from vinylpyrrolidone and ethylenically unsaturated esters as suspension stabilizers, in which process the suspension stabilizer used is a copolymer formed from vinylpyrrolidone and an alkyl acrylate, the alkyl group of which contains at least 6 carbon atoms. The aim of the process is to obtain a polymer in the form of particles having an increased porosity. Polymerization in the presence of other suspension stabilizers, such as, for example, polyvinyl alcohol and the polymers of vinylpyrrolidone or its copolymers with vinyl acetate or acrylamide, is described as unsatisfactory, since it results in products composed of dense and in most cases spherical particles which have only an insufficient porosity.

More recently, German Offenlegungsschrift No. 2,629,880 has disclosed a process for the preparation of polyvinyl chloride and vinyl chloride copolymers having a low fish-eye count and a high capacity for absorbing plasticizer, wherein polymerization is carried out in the presence of a combination of two protective colloids, one of which is a polyvinyl acetate having a degree of hydrolysis of 40 to 55 mole % and the second of which is a water-soluble polyvinyl alcohol or an aminoethylhydroxypropylcellulose or a vinyl acetate/vinylpyrrolidone copolymer having a ratio of vinylpyrrolidone to vinyl acetate in the copolymer of from 50 to 70% by weight to 30 to 50% by weight and a K-value of 25 to 40. While the polyvinyl acetate having a degree of hydrolysis of 40 to 55 mole % is substantially insoluble in water, the protective colloids mentioned as the second component of the mixture are evidently readily soluble in water, since their viscosity is determined on a 2% strength solution in water and they can also be added to the polymerization batch in the form of an aqueous solution.

Finally, German patent specification No. 1,206,592 discloses a process for the preparation of aqueous, latex-like polymer dispersions by polymerizing organic compounds capable of being polymerized by a free radical mechanism, in an aqueous phase, while stirring and in the presence of water-soluble catalysts and polymeric N-vinylamides, by means of which process styrene, vinyl esters, esters of acrylic or methacrylic acid or mixtures of vinyl acetate and dibutyl maleate are polymerized in the presence of polymeric, open-chain N-vinylamides or copolymers thereof which are water-soluble or can be dispersed in water. Mixtures of the said dispersing agents with one another and with other dispersing agents, such as, for example, water-soluble organic colloids, are possible. The description does not say which other water-soluble, organic colloids are intended. Nor is there any example of these. Apart from the fact that the last-mentioned publication does not state anything concerning the polymerization of vinyl chloride, the aim of the process is evidently the preparation of latex-like polymer dispersions in which the size and structure of the polymer particles, the viscosity of the latex and the resistance to water and re-emulsifiability of a film produced from the dispersion can be adjusted in an optimum manner, the products being used for coating purposes and as adhesives. As will be apparent from the comparison experiments, it is obviously not the aim of the process described to prepare in an aqueous phase readily filterable polymer suspensions which settle out.

The products prepared by the known processes do not give satisfaction in all cases, as will be shown in the following text by means of comparison experiments. They exhibit at least one of the following defects: unfavorable heat stability, inadequate porosity of the polymer particles and thus unfavorable absorption of plasticizer, residual monomers not removable in a satisfactory manner, polymerization or working up unfavorable from the point of view of economy, bad odor of the polymer produced, polymer particles hard to disintegrate, fish-eyes in semi-finished products, for example films, when the polymer is subjected to thermoplastic further processing, and unfavorable polymer particle size distribution.

A process has been found, giving a product which has a favorable combination of properties and which does not have the defects described above or has them only to a reduced extent, compared with the products according to the state of the art.

This process for the polymerization of vinyl chloride in an aqueous phase, in the presence of 0 to 20% by weight, relative to monomers employed, of monomers which can be copolymerized with vinyl chloride, or 0.1 to 20% by weight, relative to monomers employed, of polymers which can be graft-copolymerized with vinyl chloride, or in the presence of the said quantities of monomers which can be copolymerized with vinyl chloride and of polymers which can be graft-copolymerized with vinyl chloride, oil-soluble activators which decompose to form free radicals, and a mixture of 2 or more high-molecular, surface-active suspending agents and, optionally, in the presence of emulsifiers, buffer substances and chain-transfer agents at 30° to 80° C., comprises using 0.05 to 1% by weight, relative to monomers employed, of a mixture of suspending agents which is composed of (a) 10 to 90% by weight, relative to the mixture, of a copolymer having a viscosity of $1 \times 10^{-3}$ to $50 \times 10^{-3}$ Pa.s, determined in a 2% strength by weight solution in isopropanol at 25° C., and consisting of 10 to 50% by weight, relative to the copolymer, of polymerized units of at least one compound of the formula

wherein $R_1$ is H or denotes an alkyl radical having 1 to 4 C atoms, $R_2$ is H or denotes methyl, and 50 to 90% by weight, relative to the copolymer, of polymerized units of vinyl acetate, and of (b) 90 to 10% by weight, relative to the mixture of suspending agents, of at least one suspending agent selected from the following substances: methylcellulose, methylhydroxyethylcellulose or methylhydroxypropylcellulose having a molecular degree of substitution by the methoxy group of about 1.4 to about 2.4 and a molar degree of substitution by the hydroxyalkoxy group, if present, of about 0.08 to about 0.28; or hydroxyethylcellulose or hydroxypropylcellulose having a molar degree of substitution of about 1 to about 3.5; or aminoethylhydroxypropylcellulose having a molar degree of substitution by the aminoethyl group of 0.05 to about 1 and by the hydroxypropyl group of about 3 to about 5, the 2% strength by weight aqueous solution of the said cellulose ethers having a viscosity at 20° C. of $20 \times 10^{-3}$ to $500 \times 10^{-3}$ Pa.s, or partly acetylated polyvinyl alcohols having an acetate content of 5 to 25% by weight and a viscosity in a 4% strength by weight aqueous solution at 20° C. of $2 \times 10^{-3}$ to $100 \times 10^{-3}$ Pa.s. The copolymers indicated as component (a) of the mixture of suspending agents can be prepared by known processes, such as are described, for example, in German patent specification No. 1,627,027 and German patent specification No. 1,176,124. If they contain lower proportions of polymerized vinyl acetate units (say 50 to 65% by weight), they can be added as such to the aqueous liquor in which the polymerization is to be carried out. However, it is advisable to prepare solutions of the copolymers beforehand and to add these to the polymerization liquor. The following are suitable solvents: water, aliphatic alcohols having 1 to 4 C atoms, for example methanol or ethanol, aliphatic ketones having 3 to 5 C atoms, for example acetone or methyl ethyl ketone, or aliphatic carboxylic acid esters of aliphatic alcohols, which can contain 1 to 3 C atoms in both the carboxylic acid part and in the alcohol part, for example methyl acetate or ethyl acetate. For copolymers which have a comparatively low content of polymerized vinyl acetate groups, for example 50 to 65% by weight, water is the preferred solvent. If the content of copolymerized vinyl acetate groups is greater, mixtures of water and the said organic solvents are used, or these solvents are used without addition of water, optionally mixed with one another.

If the content of copolymerized vinyl acetate groups is greater than 90% by weight, a rapid impairment of the porosity of the polymer particle is observed. The same phenomenon, although with a slower rate of decline, is detected if the content of copolymerized vinyl acetate groups in the copolymer is less than 50% by weight. As the porosity decreases, a deterioration in the ease of degassing also occurs. A particularly favorable combination of properties in the vinyl chloride polymer produced is achieved using mixtures of suspending agents containing, as the component (a), a copolymer which contains 60 to 80, and especially 65 to 75, % by weight, relative to the copolymer, of polymerized units of vinyl acetate and accordingly contains 20 to 40, and especially 25 to 35, % by weight, relative to the copolymer, of polymerized units of a compound of the formula (1). A copolymer which has a viscosity of $2 \times 10^{-3}$ to $20 \times 10^{-3}$ Pa.s, determined on a 2% strength by weight solution in isopropanol at 25° C., is also advantageous as the component (a) for the preparation of the vinyl chloride polymers.

The new mixture of suspending agents should contain 10 to 90% by weight, relative to the mixture, of the component (a) described in greater detail above and 90 to 10% by weight, relative to the mixture, of a component (b) which contains cellulose ethers and/or partially acetylated polyvinyl alcohols. If the mixture of suspending agents contains more than 90% by weight of the component (a), a decrease in bulk density and an increase in grit formation (particularly coarse polymer particles, which lead to difficulties of many kinds in polymerization and subsequent further processing) are observed. If the content of the component (a) in the mixture of suspending agents is less than 10% by weight, the resulting polymer forms glassy particles to an increasing extent and the porosity declines (see comparison tests D and F). Particularly good results are achieved using mixtures of suspending agents which contain 25 to 75, and particularly 40 to 60, % by weight of the component (a) and accordingly 75 to 25, and particularly 60 to 40, % by weight of the component (b).

The component (a) of the mixture of suspending agents can also consist of a mixture of several copolymers which differ from one another either as a result of different contents of copolymerized units of vinyl acetate within the scope of the limits indicated or as a result of different copolymerized compounds of the formula (1) or as a result of both factors. Copolymers which contain copolymerized units of N-vinyl-N-methylacetamide and/or N-vinyl-acetamide in addition to vinyl acetate are preferred because of their ready accessibility and effectiveness.

Cellulose ethers and partially acetylated polyvinyl alcohols which are in themselves known as suspending agents are used as the component (b) of the mixture of suspending agents. The component (b) can also consist of a mixture of several of the said compounds. Particularly good results are obtained using methylhydroxypropylcellulose having a molecular degree of substitution by the methoxy group of about 1.4 to about 2.4 and a molar degree of substitution by the hydroxypropyl group of about 0.08 to about 0.28, and also using partially acetylated polyvinyl alcohols having an acetate content of 5 to 25% by weight and a viscosity, of a 4% strength by weight aqueous solution at 20° C., of $2 \times 10^{-3}$ to $100 \times 10^{-3}$, and particularly $5 \times 10^{-3}$ to $50 \times 10^{-3}$ Pa.s. In the selection last mentioned it is also advantageous to employ mixtures of the cellulose ether with a partially acetylated polyvinyl alcohol.

The molar degree of substitution of the cellulose alkyl ether or cellulose alkyl hydroxyalkyl ether is calculated from the % by weight of alkoxy groups or $-OC_2H_4-$ or $-OC_3H_6-$ groups determined analytically in accordance with the following formula:

$$MS = \frac{W\%\,(ana) \times 162}{M(ana)\left[100 - \Sigma\,W\%\,(ana)\frac{M(add)}{M(ana)}\right]}$$

In this formula, the terms denote the following:
MS=molar degree of substitution
M(ana)=molecular weight of the group analyzed
M(add)=molecular weight of the group added on
W%(ana)=percentage content by weight of the group analyzed.

The molar degree of substitution indicates how many alkyl radicals or hydroxyalkyl radicals are present per dehydrated glucose unit in the cellulose ether. As well as the abovementioned cellulose ethers and partially acetylated polyvinyl alcohols, other known suspending agents, for example gelatine, starch ethers (dextran), copolymers of maleic acid or half-esters thereof with styrenes or vinyl ethers or polyvinyl alcohol or partially acetylated polyvinyl alcohol having an acetate content of 0.5 to 4.9% by weight, can also be employed, but not with the same advantages as the cellulose ethers and partially acetylated polyvinyl alcohols described earlier in the text.

The component (b) of the mixture of suspending agents is generally added to the polymerization liquor in the form of an aqueous solution. This solution can contain aliphatic alcohols which are miscible with water, for example methanol or ethanol, in order to improve the solubility of the appropriate suspending agent.

The whole mixture of suspending agents is used in a quantity of 0.05 to 1% by weight, relative to monomers employed. If a quantity above 1% by weight is added, the resulting polymer becomes increasingly finely particulate, difficulties arise as a result of dusting in processing the dry polymer powder and the free-flowing properties and bulk density decrease. If less than 0.05% by weight of the mixture of suspending agents is used, coarse constituents and agglomerations of polymer particles, grit formation, as it is called, appear to an increasing extent and the resulting polymer suspensions become unstable, which can lead to the formation of lumps in the polymerization kettle. It is preferable to use the mixture of suspending agents in quantities of 0.1 to 0.3% by weight, relative to monomers employed.

The process according to the invention is suitable for the polymerization of vinyl chloride in an aqueous phase in the presence of 0 to 20% by weight, relative to monomers employed, of monomers which are copolymerizable with vinyl chloride, good results being achieved in the presence of 0 to 10% by weight of copolymerizable monomers. The homopolymerization of vinyl chloride also gives particularly good results. The process can also be used for the graft copolymerization of vinyl chloride, it being possible for other copolymerizable monomers besides vinyl chloride to be present. In this case 0.1 to 20% by weight, preferably 1 to 15% by weight, of polymers which can be graft-copolymerized with vinyl chloride are employed.

The preparation, according to the invention, of vinyl chloride homopolymers, copolymers or graft copolymers can be effected by a continuous or a batch polymerization process and with or without the use of a seed pre-polymer. Polymerization is carried out in aqueous suspension in the presence of 0.001 to 3% by weight, preferably 0.01 to 0.3% by weight, relative to monomers, of catalysts which form free radicals, such as, for example, diaryl or diacyl peroxides, such as diacetyl, acetylbenzoyl, dilauroyl, dibenzoyl, bis-2,4-dichlorobenzoyl or bis-2-methylbenzoyl peroxides; dialkyl peroxides, such as di-tert.-butyl peroxide, per-esters, such as tert.-butyl percarbonate; tert.-butyl peracetate, tert.-butyl peroctoate or tert.-butyl perpivalate; dialkyl peroxydicarbonates, such as diisopropyl, diethylhexyl, dicyclohexyl, diethylcyclohexyl peroxydicarbonates; mixed anhydrides of organic sulfo-peracids and organic acids, such as acetylcyclohexylsulfonyl peroxide; as polymerization catalysts, known azo compounds, such as azoisobutyronitrile, and also, if appropriate, added quantities of persulfates, such as potassium, sodium or ammonium persulfate, hydrogen peroxide or tert.-butyl hydroperoxide or other water-soluble peroxides and also mixtures of various catalysts can be employed, and peroxide catalysts can also be employed in the presence of 0.01 to 1% by weight, relative to monomers, of one or more reducing substances suitable for building up a redox catalyst system, such as, for example, sulfites, bisulfites, dithionites, thiosulfates or aldehyde sulfoxylates, for example Na formaldehyde sulfoxylate.

In addition, the polymerization can be carried out in the presence of 0.01 to 1% by weight, relative to monomers, of one or more nonionic emulsifiers, and the emulsifiers can be employed both for pre-emulsifying the monomers on their own and in the actual polymerization as a mixture with the abovementioned suspending agents.

The following are examples of suitable nonionic emulsifiers: polyoxyethylene esters of fatty acids and also polypropylene oxide/polyethylene oxide condensation products. In addition to catalysts, the mixture, according to the invention, of suspending agents and, optionally, emulsifiers, the polymerization can be carried out in the presence of buffer substances, for example alkali metal acetates or borax; alkali metal carbonates, alkali metal phosphates, ammonia or ammonium salts of carboxylic acids and also molecular size regulators, such as, for example, aliphatic aldehydes having 2 to 4 carbon atoms, chlorinated or brominated hydrocarbons, such as, for example, dichloroethylene, trichloroethylene, chloroform, bromoform or methylene chloride, and also mercaptans. Examples of further suitable polymerization auxiliaries are to be found in H. Kainer "Polyvinylchlorid und Vinylchlorid-Mischpolymerisate" ("Polyvinyl Chloride and Vinyl Chloride Copolymers"), 1965 edition, pages 13 to 34.

One or more of the following monomers, for example, are suitable for copolymerization with vinyl chloride: olefins, such as ethylene or propylene, vinyl esters of straight-chain or branched carboxylic acids having 2 to 20, preferably 2 to 4, carbon atoms, such as vinyl acetate, vinyl propionate, vinyl butyrate, vinyl 2-ethylhexoate or vinyl isotridecanoate; vinyl halides, such as vinyl fluoride, vinylidene fluoride or vinylidene chloride, vinyl ethers, vinylpyridine, unsaturated acids, such as maleic, fumaric, acrylic or methacrylic acids and monoesters or diesters thereof with monoalcohols or dialcohols having 1 to 10 carbon atoms; maleic anhydride, maleimide and N-substitution products thereof containing aromatic, cycloaliphatic and, if appropriate, branched aliphatic substituents; acrylonitrile and styrene.

For the graft copolymerization it is possible to use, for example, crosslinked or non-crosslinked elastomeric polymers which have been obtained by polymerizing one or more of the following monomers: dienes, such as butadiene or cyclopentadiene; olefins, such as ethylene or propylene; styrene, unsaturated acids, such as acrylic or methacrylic acid and esters thereof with monoalcohols or dialcohols having 1 to 10 carbon atoms, acrylonitrile, vinyl compounds, such as vinyl esters of straight-chain or branched carboxylic acids having 2 to 20, preferably 2 to 4, carbon atoms, and vinyl halides, such as vinylidene chloride and vinyl chloride. The latter, however, can only be used with at least one of the monomers mentioned previously.

The polymerization is carried out at temperatures from 30° to 80° C., preferably at from 45° to 75° C., and it is possible to carry out polymerization, if desired, with reflux cooling and the use of 2 or more stirring speeds and/or temperature stages. The pH value of the polymerization liquor should be between 2 and about 10.

During the polymerization it is possible to add one or more of the following substances, while, if appropriate, maintaining the filled volume of the polymerization vessel constant: water, aqueous solutions, monomers, catalysts, co-catalysts and further polymerization auxiliaries, such as, for example, chain transfer agents, buffer substances, emulsifiers or suspending agents.

Polymers prepared in accordance with the invention can be freed from residual monomers, particularly vinyl chloride, by known processes, either in an aqueous dispersion, as a water-moist cake or in a pulverulent moist or dry state.

The aqueous polymer dispersion is also worked up to give a dry powder in accordance with known methods, for example by decanting the bulk of the aqueous phase in a decanter-centrifuge and drying the water-moist cake thus obtained in a pneumatic conveying dryer or a fluidized bed dryer. Pulverulent polymers obtained in this way can be subjected to thermoplastic processing in the same way as hitherto conventional vinyl chloride suspension polymers, for example by extrusion, injection molding or calendering.

As a result of the favorable combination of properties of the polymers prepared in accordance with the invention, in respect of bulk density, plasticizer absorption, particle size distribution and low tendency to form fish-eyes, the polymers are particularly suitable for processing procedures intended to produce high quality articles at a high rate, particularly glass-clear articles having satisfactory optical characteristics. The fact that they can be degassed easily makes it possible to produce the polymers according to the invention in an economically advantageous and physiologically harmless manner and ensures that their further processing and the use of articles manufactured from them is also physiologically harmless.

The examples which follow are intended to illustrate the invention in greater detail. For comparison with processes according to the state of the art, a number of comparison tests have been carried out, which are also described below and, to give a better comparison, are listed in a table, together with the results of the examples according to the invention.

The results of measurements were determined in accordance with the following methods:

1. K-value as specified in DIN 53,726, solvent: cyclohexanone;
2. Bulk density as specified in DIN 53,468;
3. Plasticizer absorption (at the same time a measure of porosity) as specified in DIN 53,417;

4. Hot miscibility (so-called "dry-blend test"): 400 g of vinyl chloride polymer are preheated for 5 minutes at 88° C. and 100 rpm in a Type 600 S Brabender planetary mixer and 200 g of diethylhexyl phthalate are then mixed in. The torque of the mixer is observed continuously during the mixing in and for some time thereafter. Depending on the capacity of the polymer for absorbing plasticizer, the torque increases with varying rapidity after the diethylhexyl phthalate has been added, falling again thereafter. The minimum value of the torque is designated the "dry point". The time from the addition of the diethylhexyl phthalate until the "dry point" is reached is listed in the following table in minutes and seconds, as a characteristic parameter for the absorption of plasticizer by the vinyl chloride polymer powder.

5. Particle size distribution as specified in DIN 53,743. The quantity of particles, in % by weight, relative to the total quantity of the polymer employed, which are larger than 250 $\mu$m and smaller than 63 $\mu$m, is quoted in each case.

6. Fish-eyes: The fish-eye count is determined as follows:

| | | |
|---|---|---|
| 210 g | of vinyl chloride polymer, | |
| 84 g | of di-2-ethylhexyl phthalate, | |
| 3 g | of titanium dioxide (rutile type), | |
| 3 g | of barium/cadmium laurate (stabilizer BC 12 of Ciba-Geigy), | in the form of a ground paste |
| 5.7 g | of di-2-ethylhexyl phthalate and | |
| 0.3 g | of phthalocyanine blue (Heliogenblau 6902 K of BASF) are intimately mixed. | |

A mill hide is prepared from this mixture at a roll temperature of 140° C. and is taken off after 20 minutes in a thickness of 200 $\mu$m and is cooled. The sheet is stretched over a lamp. The unpigmented particles in an area of 100 cm$^2$ are counted.

7. Residual vinyl chloride content: determined by gas chromatography by the "head-space" method (Zeitschrift für analytische Chemie, 255 (1971), pages 345 to 350).

EXAMPLE 1

The following components are initially placed in a stainless steel polymerization kettle equipped with a double jacket for temperature control and an infinitely variable impeller stirrer:

170,000 parts by weight of deionized water, 100 parts by weight of a statistical copolymer formed from 35% by weight of N-vinyl-N-methylacetamide and 65% by weight of vinyl acetate, having a viscosity of $3 \times 10^{-3}$ Pa·s, determined in a 2% strength by weight solution in isopropanol at 25° C.; 44 parts by weight of a partially acetylated polyvinyl alcohol with an acetate content of 22% by weight and a viscosity of $11 \times 10^{-3}$ Pa·s, determined in a 4% strength by weight aqueous solution at 20° C.; 32 parts by weight of methylhydroxypropylcellulose having a molecular degree of substitution by the methoxy group of 1.84 and by the hydroxypropyl group of 0.16 and having a viscosity of $45 \times 10^{-3}$ Pa·s, determined in a 2% strength by weight aqueous solution at 20° C.; and 55 parts by weight of di-(2-ethylhexyl)

peroxydicarbonate (65% strength by weight solution in aliphatic solvents).

While the liquid is stirred, the air contained in the kettle is displaced by nitrogen and 100,000 parts by weight of vinyl chloride are then added. The mixture is warmed to 53° C. and is polymerized at this temperature until the pressure has fallen to 0.4 MPa.

The polymerization kettle is now let down to atmospheric pressure and evacuated. The contents are then cooled and two 1-liter portions of the resulting polymerization dispersion are withdrawn. 1 Liter of this is put into a 2-liter glass flask and warmed to 80° C. and 6% by weight, relative to the dispersion employed, of water are evaporated in the course of 60 minutes at 0.048 MPa while maintaining this temperature and stirring. The quantity of water evaporated is determined by condensation in a trap. Samples are taken from the suspension every 10 minutes and are filtered, and the content of residual vinyl chloride is determined by gas chromatography in the polymer cake, which contains 20% by weight of water.

The second liter of dispersion taken from the polymerization kettle is filtered immediately (without the heat treatment at 80° C. described above) and the content of residual vinyl chloride is determined by gas chromatography in the polymer cake, which contains 20% by weight of water.

The remaining contents of the kettle are filtered and the product is dried. The further tests are carried out on the polyvinyl chloride powder obtained in this way.

In order to provide a clearer summary, the figures determined are compiled in Table 1 below.

EXAMPLE 2

The procedure followed is as described in Example 1, but employing, instead of the 100 parts by weight of the (35/65) copolymer, 100 parts by weight of a statistical copolymer which consists of 25% by weight of N-vinyl-N-methylacetamide and 75% by weight of vinyl acetate and which has a viscosity of $6 \times 10^{-3}$ Pa·s, determined in a 2% strength by weight solution in isopropanol at 25° C. The figures determined on the resulting polymer are listed in Table 1.

COMPARISON EXPERIMENT A

The procedure followed is as described in Example 1, with the difference that 200 parts by weight of sorbitane monolaurate are employed instead of the 100 parts by weight of copolymer formed from N-vinyl-N-methylacetamide and vinyl acetate. See Table 1 for values.

COMPARISON EXPERIMENT B

This comparison experiment is carried out on the model of German Offenlegungsschrift No. 2,629,880. The procedure followed is as described in Example 1, but employing, instead of the 100 parts by weight of copolymer formed from 35% by weight of N-vinyl-N-methylacetamide and 65% by weight of vinyl acetate, 100 parts by weight of a statistical copolymer which is formed from 60% by weight of N-vinyl-N-methylacetamide and 40% by weight of vinyl acetate and which has a viscosity of $4 \times 10^{-3}$ Pa·s, determined in a 2% strength by weight solution in isopropanol at 25° C., and a K-value of 33. See Table 1 for values determined on the polymer produced.

COMPARISON EXPERIMENT C

This comparison experiment is carried out on the model of German Offenlegungsschrift No. 1,645,380. The procedure followed is as described in Example 1, but employing, instead of the 100 parts by weight of a copolymer formed from N-vinyl-N-methylacetamide and vinyl acetate, 100 parts by weight of a copolymer which is formed from 90% by weight of vinylpyrrolidone and 10% by weight of 2-ethylhexyl acrylate and which has a viscosity of $4 \times 10^{-3}$ Pa·s, determined in a 2% strength by weight solution in isopropanol at 25° C. See Table 1 for values determined on the polymer produced.

COMPARISON EXPERIMENT D

The procedure followed is as described in Example 1, but the 100 parts by weight of copolymer formed from N-vinyl-N-methylacetamide and vinyl acetate are omitted. See Table 1 for values determined on the polymer produced.

EXAMPLE 3

The following components are initially placed in the same apparatus as that described in Example 1:

170,000 Parts by weight of deionized water, 50 parts by weight of a statistical copolymer formed from 35% by weight of N-vinyl-N-methylacetamide and 65% by weight of vinyl acetate, having a viscosity of $3 \times 10^{-3}$ Pa·s, determined in a 2% strength by weight solution in isopropanol at 25° C.; 45 parts by weight of a partially acetylated polyvinyl alcohol having an acetate content of 21% by weight and a viscosity of $5 \times 10^{-3}$ Pa·s, determined in a 4% strength by weight aqueous solution at 20° C.; 35 parts by weight of hydroxypropylcellulose having a molar degree of substitution of 1.34 and a viscosity, of a 2% strength by weight aqueous solution at 20° C., of $30 \times 10^{-3}$ Pa·s; and 55 parts by weight of di-(2-ethylhexyl) peroxydicarbonate (65% strength by weight solution in aliphatic solvents); and the further procedure described in Example 1 is followed. See Table 1 for values determined on the polymer produced.

EXAMPLE 4

The following components are initially placed in an apparatus which is also constructed as described in Example 1:

15,000 Parts by weight of deionized water, 10 parts by weight of a statistical copolymer formed from 35% by weight of N-vinyl-N-methylacetamide and 65% by weight of vinyl acetate, having a viscosity of $3 \times 10^{-3}$ Pa·s, determined in a 2% strength by weight solution in isopropanol at 25° C.; 12 parts by weight of a partially acetylated polyvinyl alcohol having an acetate content of 15% by weight and a viscosity of $35 \times 10^{-3}$ Pa·s, determined in a 4% strength by weight aqueous solution at 20° C.; 2 parts by weight of di-(2-ethylhexyl) peroxydicarbonate (65% strength of weight solution in aliphatic solvents); 5 parts by weight of dilauroyl peroxide; and 6 parts by weight of ammonium bicarbonate.

While the liquid is being stirred, the air contained in the kettle is displaced by nitrogen and 8,800 parts by weight of vinyl chloride and 1,200 parts by weight of vinyl acetate are then added. The mixture is warmed to 62° C. and polymerized at this temperature until the pressure has fallen by 0.6 MPa.

The further procedure then followed is as described in Example 1, but samples are taken from the suspension every 15 minutes during the evaporation of the water. The values determined on the polymer produced are listed in Table 2.

COMPARISON EXPERIMENT E

The procedure followed is as described in Example 3, but employing, instead of the 10 parts by weight of the copolymer formed from N-vinyl-N-methylacetamide and vinyl acetate, 10 parts by weight of a polyvinyl acetate which has an acetate content of 33% by weight and has been hydrolyzed to the extent of 50%, and has a viscosity number of 15 cm$^3$/g, determined as specified in DIN 53,728 in methanol, at a concentration of 10 g/l. See Table 2 for values determined on the polymer produced.

COMPARISON EXPERIMENT F

The procedure followed is as described in Example 3, but the 10 parts by weight of copolymer formed from N-vinyl-N-methylacetamide and vinyl acetate are omitted. See Table 2 for values determined on the polymer produced.

polymer, of polymerized units of at least one compound of the formula $$R_1-\overset{O}{\overset{\|}{C}}-N-\overset{R_2}{\underset{|}{C}}H=CH_2, \quad (1)$$

wherein $R_1$ is H or denotes an alkyl radical having 1 to 4 C atoms, $R_2$ is H or denotes $CH_3$—, and 50 to 90% by weight, relative to the copolymer, of polymerized units of vinyl acetate, and of (b) 90 to 10% by weight, relative to the mixture of suspending agents, of at least one suspending agent selected from the following substances: methylcellulose, methylhydroxyethylcellulose or methylhydroxypropylcellulose having a molecular degree of substitution by the methoxy group of about 1.4 to about 2.4 and a molar degree of substitution by the hydroxyalkoxy group, if present, of about 0.08 to about 0.28; or hydroxyethylcellulose or hydroxypropylcellulose having a molar degree of substitution of about 1 to about 3.5; or aminoethylhydroxypropylcellulose having a molar degree of substitution by the aminoethyl group of about 0.5 to about

TABLE 1

| | K-value | Bulk density [g/l] | Plasticizer adsorption [%] | Hot miscibility | Particle size distribution | | Fish-eyes [per 100cm$^2$] | Residual vinyl chloride content* | |
|---|---|---|---|---|---|---|---|---|---|
| | | | | | >250 μm [%] | <63 μm [%] | | Blind value | after 20 minutes |
| Example 1 | 70 | 435 | 42 | 3'15" | 0 | 0 | 5 | 7600 | <1 |
| Example 2 | 71 | 440 | 40 | 3'20" | 0 | 0 | 2 | 8400 | 2 |
| Comparison Example A | 70 | 465 | 32 | 4'30" | 3 | 1 | 24 | 5300 | 6 |
| Comparison Example B | 70 | 450 | 29 | 4'45" | 1 | 1 | 15 | 9600 | 8 |
| Comparison Example C | 71 | 455 | 18 | 5'20" | 16 | 0 | 300 | 6300 | 24 |
| Comparison Example D | 70 | 475 | 18 | 5'30" | 19 | 0 | 200 | 7500 | 78 |
| Example 3 | 70 | 435 | 41 | 3'25" | 4 | 0 | 10 | 6900 | <1 |

*Figures in parts by weight of vinyl chloride in 1,000,000 parts by weight moist polymer containing 20% of water.

TABLE 2

| | K-value | Bulk density [g/l] | Plasticizer adsorption [%] | Particle size distribution | | Residual vinyl chloride content* | |
|---|---|---|---|---|---|---|---|
| | | | | >250 μm [%] | <63 μm [%] | Blind value | after 45 minutes |
| Example 4 | 58 | 500 | 15 | 0 | 5 | 10 800 | 5 |
| Comparison Example E | 58 | 515 | 12 | 0 | 6 | 9 100 | 10 |
| Comparison | 58 | 560 | 6 | 1 | 10 | 9 600 | 200 |

*Figures in parts by weight of vinyl chloride in 1,000,000 parts by weight of moist containing 20% of water

We claim:

1. Process for the polymerization of vinyl chloride in an aqueous phase, in the presence of 0 to 20% by weight, relative to monomers employed, of monomers which can be copolymerized with vinyl chloride, oil-soluble activators which decompose to form free radicals, and a mixture of high-molecular, surface-active suspending agents at 30° to 80° C., which comprises using 0.05 to 1% by weight, relative to monomers employed, of a mixture of suspending agents which is composed of (a) 10 to 90% by weight, relative to the mixture, of a copolymer having a viscosity of $1\times10^{-3}$ to $50\times10^{-3}$ Pa·s, determined in a 2% strength by weight solution in isopropanol at 25° C., and consisting of 10 to 50% by weight, relative to the co- 1 and by the hydroxypropyl group of about 3 to about 5, the 2% strength by weight aqueous solution of the said cellulose ethers having a viscosity at 20° C. of $20\times10^{-3}$ to $500\times10^{-3}$ Pa·s, or partly acetylated polyvinyl alcohols having an acetate content of 5 to 25% by weight and a viscosity in a 4% strength by weight aqueous solution at 20° C. of $2\times10^{-3}$ to $100\times10^{-3}$ Pa·s.

2. Process as claimed in claim 1, wherein 0.1 to 0.3% by weight, relative to monomers employed, of the mixture of suspending agents is employed.

3. Process as claimed in either of claims 1 or 2, wherein the component (a), of the mixture of suspending agents, which is employed is a copolymer which is composed of 20 to 40% by weight, relative to the copolymer, of polymerized units of at least one compound of the formula (1) and of 80 to 60% by weight, relative to the copolymer, of polymerized units of vinyl acetate.

4. Process as claimed in any one of claims 1 to 3, wherein the component (a), of the mixture of suspending agents, which is employed is at least one copolymer of vinyl acetate with N-vinyl-N-methylacetamide or with N-vinylacetamide.

5. Process as claimed in any one of claims 1 to 4, wherein the mixture of suspending agents contains 25 to 75% by weight, relative to the mixture, of the component (a) and 75 to 25% by weight, relative to the mixture, of the component (b).

6. Process as claimed in any one of claims 1 to 5, wherein the component (b), of the mixture of suspending agents, which is employed is at least one of the following compounds: methylhydroxypropylcellulose having a molecular degree of substitution by the methoxy group of about 1.4 to about 2.4 and by the hydroxypropyl group of about 0.08 to 0.28, a 2% strength by weight aqueous solution thereof having a viscosity at 20° C. of $20 \times 10^{-3}$ to $500 \times 10^{-3}$ Pa·s, or a partially acetylated polyvinyl alcohol having an acetate content of 5 to 25% by weight and a viscosity, in a 4% strength by weight aqueous solution, of $2 \times 10^{-3}$ to $100 \times 10^{-3}$ Pa·s at 20° C.

7. Process as claimed in anyone of claims 1 to 6, wherein the polymerization is carried out in the presence of an effective amount of a buffer substance.

8. Process as claimed in anyone of claims 1 to 6, wherein the polymerization is carried out in the presence of an effective amount of a chain-transfer agent.

* * * * *